United States Patent [19]

Halpine

[11] 4,113,231
[45] Sep. 12, 1978

[54] SEAL RING FOR BALL VALVES

[76] Inventor: Joseph Charles Halpine, 1908 W. Latimer Pl., Tulsa, Okla. 74127

[21] Appl. No.: 819,356

[22] Filed: Jul. 27, 1977

[51] Int. Cl.² .............................................. F16K 5/00
[52] U.S. Cl. .................................... 251/317; 251/174
[58] Field of Search ................ 251/174, 315, 317, 363

[56] References Cited

U.S. PATENT DOCUMENTS

| | | | |
|---|---|---|---|
| 2,825,527 | 3/1958 | Wendell | 251/315 X |
| 2,963,260 | 12/1960 | Siravo | 251/174 X |
| 2,988,320 | 6/1961 | Kent | 251/315 X |
| 3,883,112 | 5/1975 | Milleville | 251/174 |

Primary Examiner—Harold W. Weakley
Attorney, Agent, or Firm—Head, Johnson & Chafin

[57] ABSTRACT

An improved seal ring for a ball valve comprising, a metal ring of rectangular cross section, the inner wall of which constitutes part of the axial opening for fluid flow. The upstream face of the seal ring includes means to said seal ring to the housing. The downstream face of the seal ring includes a cylindrical channel, concentric with the axial opening in the valve housing and concentric with the inner wall of the seal ring. The downstream portion of the seal ring is cut at an angle to be substantially parallel to the spherical surface of the ball against which seal is to be made. A seat ring is provided having in cross section a rectangular portion that fits into the cylindrical groove in the seal ring and has a C-shaped portion adapted to house a length of helical spring of the same diameter as the circular interior cavity of the C portion. The circular spring is inserted into the C portion of the seat ring and the seat ring is then inserted into the groove of the seal ring means and the seat is then locked into position by means of a thin-wall portion of the seal ring, which presses against a surface of the seat ring. The internal helical spring presses the seat ring tightly against the surface of the ball.

1 Claim, 4 Drawing Figures

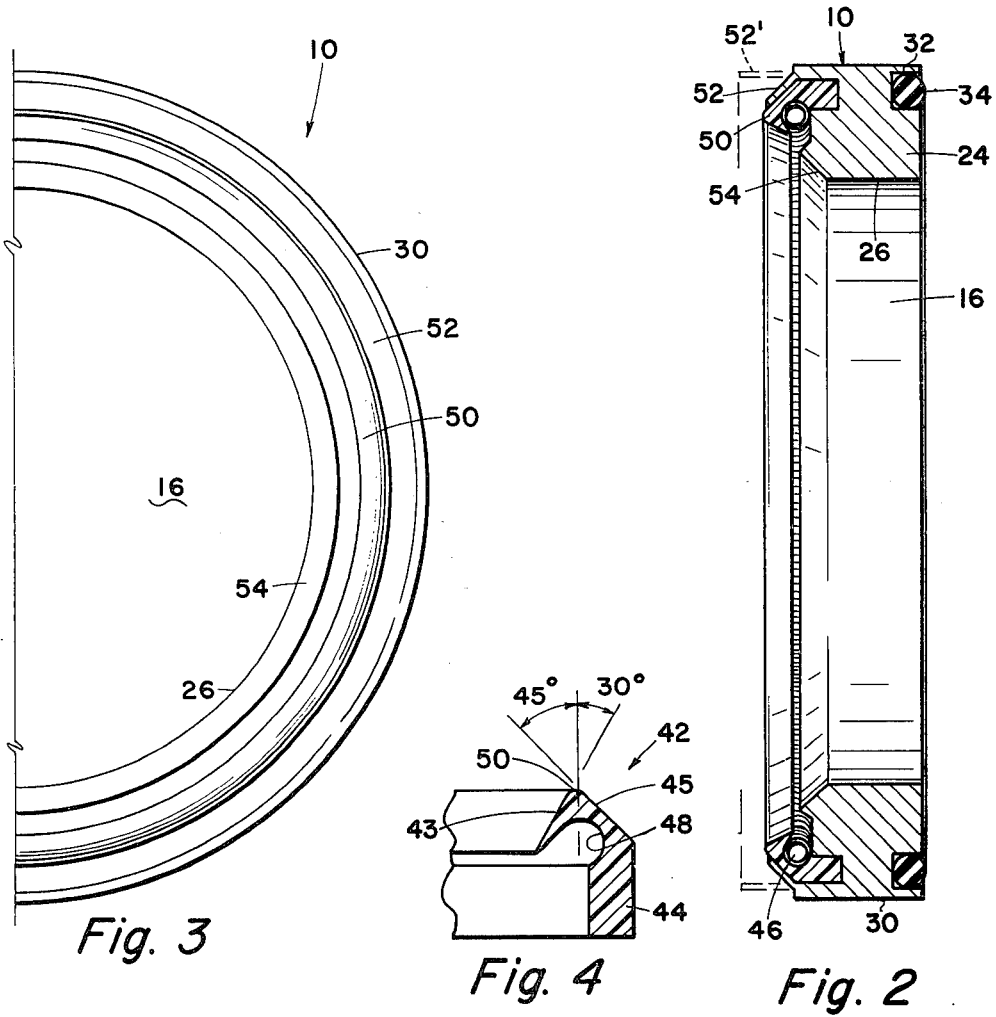
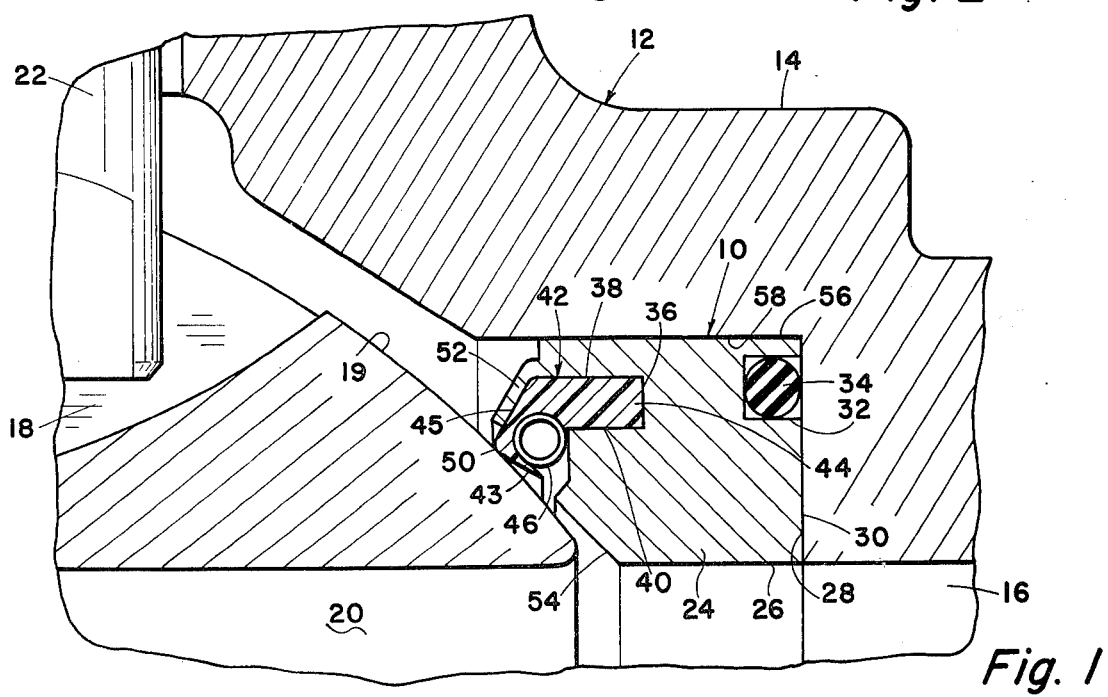
Fig. 3  Fig. 4  Fig. 2
Fig. 1

SEAL RING FOR BALL VALVES

BACKGROUND OF THE INVENTION

1. Field of the Invention

This invention lies in the field of the fluid flow devices. More particularly, it concerns the field of ball valves.

Still nore particularly, it concerns the design of a flexible seal ring means for sealing between the housing of the valve, and the ball.

2. Description of the Prior Art

In the prior art, there are types of seal rings provided, incuding O-rings and the like, for sealing between the housing and the ball of a ball valve. Each of these have weaknesses of one sort or another, the most common weakness being an inability to provide an adjustable pressure to press the sealing lips against the sealing surface of the ball. The present invention is designed to overcome this weakness and includes a spring means which is incorporated as part of the seat ring, so that adequate spring pressure is provided to continuously maintain sufficient pressure of the sealing medium against the surface of the ball, so as to prevent leakage.

SUMMARY OF THE INVENTION

It is a primary object of this invention to provide a seal ring means for a ball type valve, in which adequate pressure can be provided between the seat that seals against the ball and the sealing surface of the ball.

This and other objects are realized and the limitations of the prior art are overcome in this invention by providing a metal seal ring means, which is inserted into the housing of the ball valve, with its inner circumference forming part of the flow opening through which fluid flows through the valve. The seal ring means is sealed into the housing by means of an O-ring, so that the only passage through which the pressurized fluid can leak is along the surface of the ball between the ball surface and the seat ring pressing against the surface.

The seat ring is made of a compressible flexible material such as nylon or Teflon. The seat ring is made, with cross section in the form of a rectangle portion, with a lip which curls around in the form of a C, encircling a substantially circular ring cavity portion, into which is fitted a helical spring of selected length, which is bent around in a circle to fit into this ring cavity in the seat ring.

A cylindrical groove of rectangular cross section is provided in the downstream face of the seal ring means. The cylindrical groove is concentric with the axis of the seal ring means. There is a thin cylindrical wall extension of the downstream face of the seal ring which, after the seal ring is placed in the cylindrical groove can be bent over to conform with one surface of the seat ring, and lock the seat ring into the groove into which it has been positioned. The result is that the outer portion of the C of the seat ring is adapted to press against the surface of the ball, the pressure being provided by the helical spring, the circular turns of which have been forced to an oval shape.

Thus, the C portion of the seat ring is pressed firmly against the surface of the ball. The actual part of the seat ring contacts the ball has a ridge, the cross section of which has a radius of about 1/16 inch, which contacts and presses against the ball surface.

BRIEF DESCRIPTION OF THE DRAWINGS

These and other objects and advantages of this invention and a better understanding of the principles and details of the invention will be evident from the following description taken in conjunction with the appended drawings, in which:

FIG. 1 is a schematic diagram illustrating, in cross section, the seal ring means in contact with the surface of the ball of the valve.

FIGS. 2 and 3 show in diametral cross section and in plan view of two views of the seal ring means.

FIG. 4 is a view in cross section of the seat ring.

DESCRIPTION OF THE PREFERRED EMBODIMENT

Referring now to the drawings and in particular to FIG. 1, there is indicated by the numeral 10 the seal ring means of the valve in position inside the housing of the valve, indicated generally by the numeral 12. Internal cylindrical seat 56 and shoulder 28 of the housing provides a seat against which the seal ring means is pressed and sealed by means such as O ring 34, in a groove 32 in the upstream wall 30 of the seal ring means. The outer circumference 58 of the seal ring means 10 fit snugly into the cylindrical seat portion 56 of the housing 14. The inner circumferential wall 26 is co-axial with and co-linear with the opening 16 in the housing, through which fluid enters the valve.

The ball portion 18 of the valve has a spherical surface 19 and is supported by a shaft 22 in a conventional manner by means of which it is rotated. There is a transverse opening 20 in the ball of the same diameter, preferably as and coaxial with the opening 16 in the housing for the passage of fluid. The passage 20 in the ball has an axis which is perpendicular to the axis of the shaft 22. Thus, by rotating the shaft 22, the passage 20 can be opened to the passage 16 or can be transverse to the passage 16 and therefore blocks the flow of fluid through the valve.

In cross section, the seal ring means has an inner circumference 26, an outer circumference 56, and end wall 28 which is sealed against the housing by the O ring 34. The second downstream wall of the seal ring means is adapted to hold the seat ring, which is made of a suitable flexible elastomeric material, which actually presses against the surface 19 of the ball to make a seal.

There is a cylindrical groove having cylindrical walls 38 and 40 and a bottom surface 36 which is adapted to receive the rectangular portion 44 of the seat ring 42. The general shape, in cross section of the seat ring is shown in FIG. 4, which includes the rectangular portion 44 adapted to fit into the cylindrical groove in the seal ring means 10 and a circular ring cavity portion 48 which forms the inner surface of a C-shaped portion which has angularly spaced outer surfaces 43, 45, forming a circular ridge 50 which actually presses on the suface 19 of the ball.

A helical spring 46 is wound of suitable steel spring wire and is of selected diameter and length so that it can be fitted into the circular cavity 48 of the seat ring and be held in there by the particular shape of the ring. When the assembly 42 of the seat ring including the spring is inserted into the cylindrical groove in the seal ring means 10, a thin cylindrical wall of the seal ring 52' is bent over into position 52 and presses against the surface 45 of the seat ring and securely locks the seat ring into the cylindrical groove and retains the helical spring ring in the cavity 48. This condition is shown in FIG. 1 where the circular ridge 50, which forms the apex of the surfaces 43 and 45, provides the sealing surface against the ball. There is sufficient pressure at the point 50 against the surface 19 so that the spring is slightly distorted, forming an oval-shape, instead of a circular shape and thus providing an outward force against the surface 19, sufficient to provide sealing pressure against the fluid pressure in the bores 16, 26 and 20. In cross section, the radius of the ridge 50 is preferably about 1/16ths of an inch, so that it has a type of surface which can distort readily under suitable force to provide a seal against a selected fluid pressure.

With suitable tolerances for the machined surfaces in the housing and of the ball and with a selected wire diameter and helix diameter, the unit pressure of the ridge 50 against the surface 19 can be selected so that no adjustment is required for a selected fluid pressure seal.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. In a ball valve having a housing, an inlet duct through said housing for flow of fluid, a cylindrical seat and shoulder for a seal ring means concentric with said duct, a spherical ball inside the cavity of said housing, duct means through said ball and shaft means to rotate said ball about an axis perpendicular to the direction of said duct in said ball; the improvement in seal ring means for sealing against fluid pressure the space between said housing and said ball, comprising:

(a) a circular metal ring having an outer cylindrical surface, an inner cylindrical surface and a first end wall perpendicular thereto, said outer cylindrical surface and said first end wall adapted to fit said cylindrical seat and shoulder of said housing;
   (b) first means to seal said seal ring means to at least one of said cylindrical seat and shoulder;
   (c) a cylindrical groove, concentric with said seal ring means in the second end wall of said seal ring means, near the outer perimeter of said second end wall;
   (d) a thin-walled cylindrical extension to said second end wall at the outer edge of said cylindrical groove;
   (e) seat ring means, having in cross section a cylindrical portion adapted to fit into said cylindrical groove and a "C" shaped portion enclosing a ring cavity of circular cross section, the outer wall of said "C" shaped portion having two conical surfaces joining in a circular ridge having a selected radius of curvature;
   (f) a helical spring of selected wire of selected diameter and selected length adapted to fit into said ring cavity in said C-shaped portion;

whereby when said spring is placed in said ring cavity and said seat ring is inserted into said groove and said thin-walled cylindrical extension bent inwardly over said seat ring, it will be held snugly in said groove and will retain said spring and when said seal ring means is placed in said housing, said circular ridge will press against the spherical surface of said ball to seal the space between said housing and said ball against the pressure of fluid in said inlet duct.

* * * * *